(No Model.)
J. C. ENGLESBE.
STEAM ENGINE GOVERNOR.
No. 549,595. Patented Nov. 12, 1895.
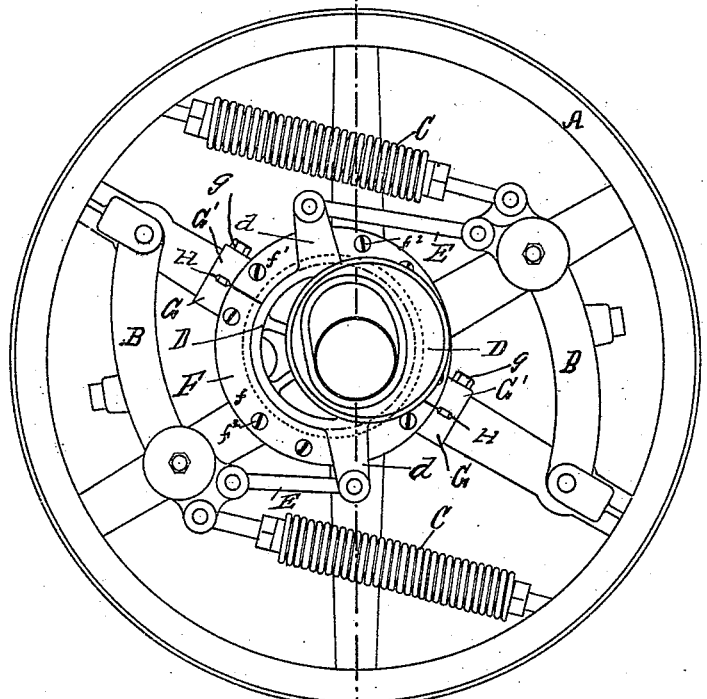
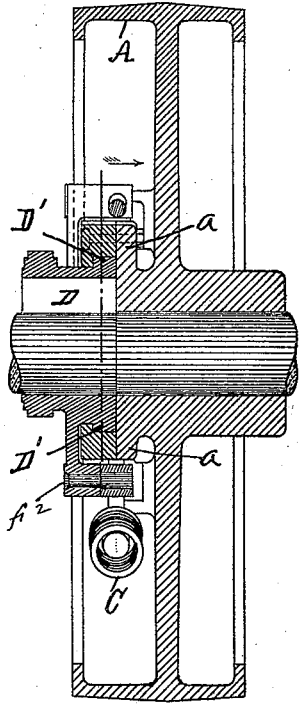
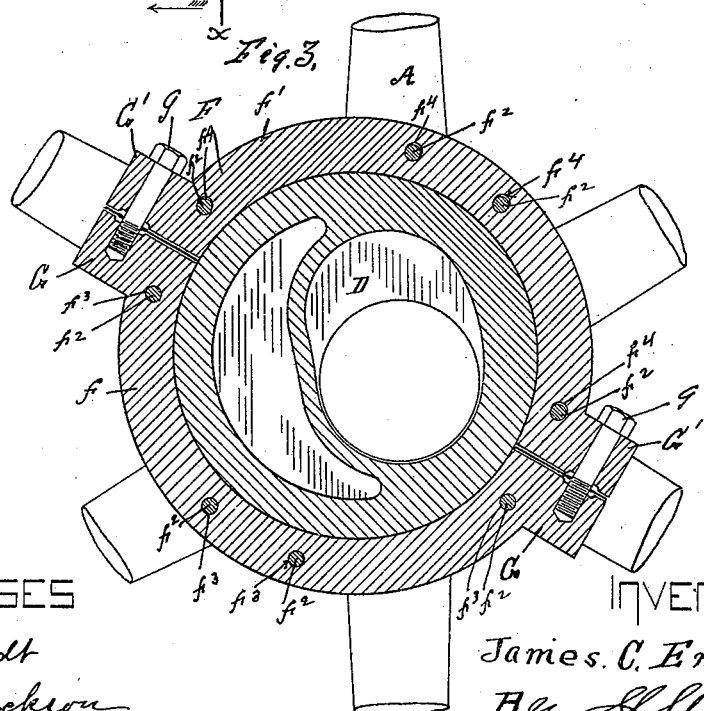
Witnesses
F. Einfeldt
A. L. Jackson
Inventor
James C. Englesbe
By H. Sturgeon
Atty.

United States Patent Office.

JAMES C. ENGLESBE, OF ERIE, PENNSYLVANIA.

STEAM-ENGINE GOVERNOR.

SPECIFICATION forming part of Letters Patent No. 549,595, dated November 12, 1895.

Application filed July 23, 1895. Serial No. 556,872. (No model.)

*To all whom it may concern:*

Be it known that I, JAMES C. ENGLESBE, a citizen of the United States, residing at the city of Erie, in the county of Erie and State of Pennsylvania, have invented certain new and useful Improvements in Steam-Engine-Governor Eccentric-Casings; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in steam-engine-governor eccentric bearings or casings hereinafter set forth and explained, and illustrated in the accompanying drawings, in which—

Figure 1 is a side view in elevation of a steam-engine governor embodying my improved eccentric casing or bearing. Fig. 2 is a vertical section of the same on the line $x\ x$ in Fig. 1. Fig. 3 is an enlarged sectional view of my improved eccentric casing or bearing.

In the construction of steam-engine governors having eccentrics for operating the valve-rod of the engine, which rotate around the shaft, it is usual to mount them in a circumferential bearing or casing secured to one side of the hub of the wheel or disk on which the governor mechanism is mounted or to make such bearing or casing integral therewith. These constructions have always made more or less trouble to the operators of engine-governors so constructed, for the reason that there was no means of adjusting the eccentric bearing or casing so as to take up the wear of the eccentric therein. I have overcome this difficulty by constructing the eccentric casing or bearing in two sections, so as to completely provide for any adjustment required.

In the construction shown in the drawings the wheel A, the weight-arms B B, the springs C C, the eccentric D, adapted to receive the eccentric-strap (not shown) operating the valve-rod of the engine, and the links E E, connecting the arms $d\ d$ of the eccentric with the weight-arms B B, are of the usual construction. The eccentric bearing or case F, I make in two half-sections $f\ f'$, which are secured to the face-plate $a$ on the hub of the wheel A by means of stud-bolts $f^2$, which pass through closely-fitting holes $f^3$ in the section $f$ of the bearing or casing F and through slotted holes $f^4$ in the section $f'$ of said bearing or case. The sections $f$ and $f'$ are also provided with ears G G', through which bolts $g$ pass, so as to clamp them together. Between the ears G G' packing H is used, the thickness of which can be decreased as wear takes place. The inner face of this bearing or casing is undercut, as illustrated in Fig. 2, so as to interlock with a collar D' on the inner end of the eccentric, so that when the bearing or case is clamped around it it is held firmly in place.

Having thus described my invention, so as to enable others to construct and use the same, what I claim as new, and desire to secure by Letters Patent of the United States, is—

1. The combination in a steam engine governor, of a wheel or disk on the engine shaft, an eccentric case or bearing, consisting of two sections adjustably bolted to the wheel or disk and adapted to be clamped together around an eccentric inclosed and rotating within said case or bearing, and valve rod operating mechanism connecting said eccentric with the engine valve, substantially as and for the purpose set forth.

2. The combination with a rotating eccentric and the valve rod mechanism of a steam engine of a governor wheel or disk A, a bearing or case F within which the eccentric rotates adjustably bolted to said wheel or disk, and constructed of sections $f, f'$ having ears G and G' thereon, and having slotted holes $f^4$ in the half or section $f'$, substantially as and for the purpose set forth.

In testimony whereof I affix my signature in presence of two witnesses.

JAMES C. ENGLESBE.

Witnesses:
 FRED. BOLTZE,
 CHARLES HEYDRICK.